United States Patent [19]
Boxall

[11] 3,911,947
[45] Oct. 14, 1975

[54] MANUALLY-ADJUSTABLE PRESSURE REGULATOR

[75] Inventor: Eric John Boxall, Haslemere, England

[73] Assignee: Martonair Limited, Middlesex, England

[22] Filed: Jan. 25, 1974

[21] Appl. No.: 436,548

[30] Foreign Application Priority Data
Feb. 5, 1973 United Kingdom.............. 5560/73

[52] U.S. Cl........................ 137/505.14; 137/505.42
[51] Int. Cl.² ......................................... F16K 31/12
[58] Field of Search..... 137/505.14, 505.15, 505.41, 137/505.42

[56] References Cited
UNITED STATES PATENTS

| | | | |
|---|---|---|---|
| 1,033,174 | 7/1912 | Hochfeldt...................... | 137/505.41 |
| 2,662,348 | 12/1953 | Jacobsson.................. | 137/505.41 X |
| 2,741,263 | 4/1956 | Spencer......................... | 137/505.14 |
| 3,098,507 | 7/1963 | Froslie........................ | 137/505.14 X |
| 3,276,470 | 10/1966 | Griffing.......................... | 137/505.15 |

*Primary Examiner*—Harold W. Weakley
*Attorney, Agent, or Firm*—Edward F. Connors

[57] ABSTRACT

A manually-adjustable pressure regulator having a pair of resiliently interconnected pistons of which one acts directly on a valve member which controls flow of a pressurised fluid and the other piston is movable by an operating spindle to open or close the valve member. A chamber is defined between the other piston and the adjacent end of the housing into which fluid is applied when the valve is open. The pressure of fluid applied to the chamber is such that the force applied to the other piston substantially balances the reaction of the valve on the other piston whereby the effort required to move the operating spindle is independent of the reaction of the valve.

1 Claim, 2 Drawing Figures

MANUALLY-ADJUSTABLE PRESSURE REGULATOR

The invention relates to manually-operable pressure regulators of the kind in which an operating spindle is adjustable to move a valve member to open a seat therefor and control flow of a pressurised fluid through the regulator. When the fluid pressure acting on the valve member is high, considerable effort is required to adjust the operating spindle to move the valve member to control the flow of fluid. It is an object of the present invention to modify a pressure regulator of the aforesaid kind to reduce the effort required to carry out adjustment of the valve member.

According to the invention, a manually-adjustable pressure regulator includes a pair of resiliently interconnected pistons movable in a cylindrical housing, a valve member positioned between inlet and outlet ports in the housing and movable between a closed and an open position, one of the pistons being movable by an operating member and having opposed end faces of which one together with the adjacent end portion of the housing defines between them a chamber having an inlet port through which a fluid under pressure is applied and against the other of which the reaction of the valve member is applied through the resilient interconnection, said other piston having opposed end faces of which one acts directly on the valve member, the valve member being movable from the closed to the open position by moving said one piston by the operating member to compress the resilient interconnection and hence to move said other piston to open the valve member and to permit fluid under pressure to enter the chamber, the pressure of said fluid being such that the fluid force applied on said one end face of said one piston substantially balances the reaction of the valve member on said other end face of said one piston, whereby the effort required to move the operating member to move the valve member is substantially independent of the reaction of the valve member.

Conveniently, the fluid under pressure is derived from an outlet or low pressure side of the valve member, whereby the force applied to said one end face of said one piston is a function of the outlet pressure of the regulator.

The resilient interconnection is conveniently a helical compression spring.

The operating spindle is conveniently screw-threaded to the housing, whereby on turning the spindle it is moved axially of the housing, thereby to move the valve member.

By way of example, a manually-adjustable pressure regulator in accordance with the invention is now described with reference to the accompanying drawings, in which.

Figure 1:
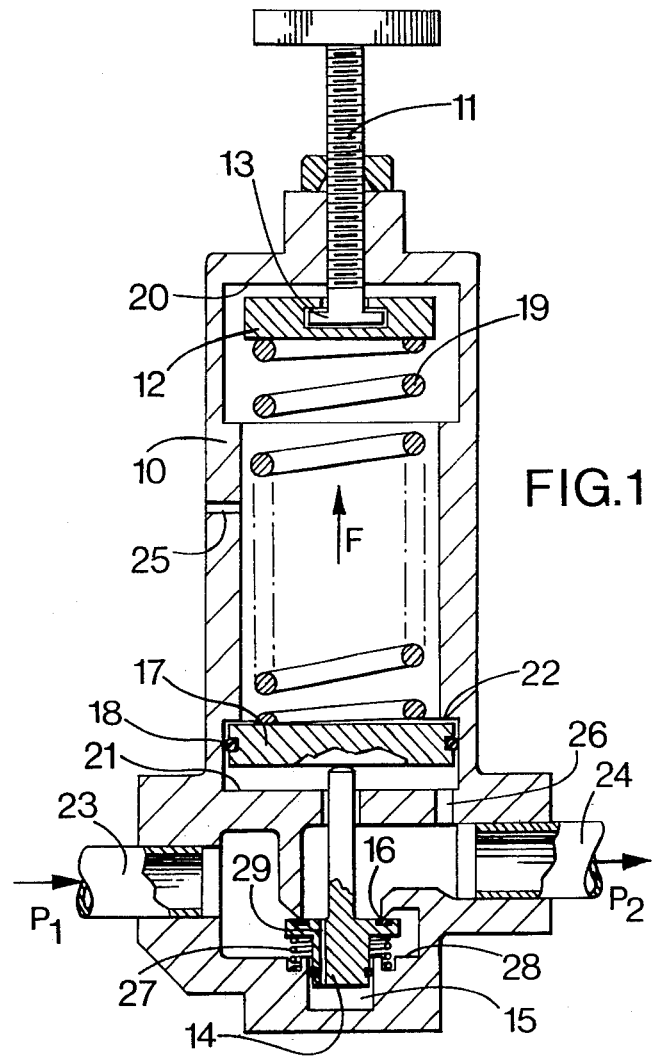
FIG. 1 is an axial section through a known type of pressure regulator.

Referring firstly to FIG. 1, the known regulator comprises a cylindrical housing 10 in which a manually-operable spindle 11 of the regulator is mounted for rotation. The spindle 11 is externally screw-threaded and carries a plunger 12 slidable in the housing 10. The plunger 12 is of smaller diameter than the internal diameter of the housing 10. The spindle 11 is engaged at its lower end with the plunger 12 by a coupling 13 which permits the spindle 11 to be rotated relatively to the plunger 12 such that on turning the spindle 11 about its axis, both the spindle 11 and the plunger 12 are moved axially in the housing 10.

The lower end face of the plunger 12, as shown in FIG. 1, acts indirectly against a valve member 14 and thus a reactive force F is applied by the valve member against the lower end face of the plunger 12. The valve member 14 is a flanged piston movable in a socket 15 in the lower end of the housing 10 to open or close a valve seat 16. The valve member 14 is engaged by a second piston 17 slidable in the housing 10. The piston 17 carries around its periphery a seal 18 which sealingly engages the housing 10. The piston 17 is separated from the plunger 12 by a helical spring 19 held between the plunger 12 and the piston 17. The axial movement of the plunger 12 relatively to the housing 10 is limited in the upward direction by the internal upper end face 20 of the housing. The axial movement of the piston 17 relatively to the housing 10 is limited in the downward direction by an internal lower end face 21 of the housing and in the upward direction by a shoulder 22 provided in the housing 10. The valve member 14 controls the flow of a pressurised fluid between an inlet duct 23 at pressure $P_1$ and an outlet duct 24 at pressure $P_2$ through the valve seat 16, the valve member 14 being shown in the closed position. A vent 25 is provided in the housing 10 and communicates with the space between the plunger 12 and the piston 17 to permit relative displacement of the two pistons. A further vent 26 is provided in the housing 10 and communicates between the space below the piston 17 and a space on the outlet side of the valve seat 16 leading to the outlet duct 24. A compression spring 27 is arranged between the flange of the valve member 14 and a recess in a further end face 28 of the housing 10. The spring 27 is provided to assist in returning the valve member 14, after it has been moved to open the valve seat 16, to its closed position. A duct 29 is provided in the valve member 14 and communicates between the lower end face of the valve member in the socket 15 and the upper face of the flange of the valve member.

The regulator is operated in the following manner:

Assuming firstly that the components of the regulator are in the positions shown in the drawing in which the valve member 14 is in the closed position to close the valve seat 16, and the plunger 12 is in its uppermost position adjacent the end face 20, the force exerted by the spring 19 on the piston 17 will be negligible so that the latter will be held against or adjacent the shoulder 22 by the valve member 14. The valve member 14 is maintained in the closed position because the sum of the forces acting in the upward direction is greater than the sum of the forces acting in the downward direction on the valve member 14. The forces which act on the valve member 14 in the upward direction are the force exerted by the spring 27 on the flange of the valve member 14, the inlet fluid pressure $P_1$ acting on the lower surface of the flange of the valve member 14 and the outlet fluid pressure $P_2$ acting on the lower end face of the valve member 14 within the socket 15. The forces which act on the valve member 14 in the downward direction are the inlet fluid pressure $P_1$ acting on the upper surface of the flange of the valve member 14 externally of the valve seat 16, and the outlet fluid pressure $P_2$ also acting on the upper surface of the flange of the valve member 14 but internally of the valve seat.

When the operating spindle 11 is turned to move the valve member 14 downwards, as viewed in the drawing, to open the valve seat 16, the plunger 12 also moves downwardly and this compresses the spring 19. The latter acts on the piston 17 which moves the valve member 14 to open the valve seat 16. The force exerted by the spring 19 on the piston 17 must be greater than the sum of the upward forces acting on the valve member 14 whereby the valve member can be moved to open the valve seat 16. When the valve seat 16 is opened, fluid at a pressure being a function of the inlet fluid pressure $P_1$ is delivered through the outlet duct 24 and into the space beneath the piston 17 through the vent 26. The pressure of the fluid in the space beneath the piston 17 will increase from the outlet fluid pressure $P_2$ to a pressure which will exert a force on the piston 17 substantially equal to the force exerted on the piston 17 by the spring 19 and the outlet fluid pressure $P_2$ will be increased to a pressure which is proportional to the amount by which the valve member 14 is moved to open the valve seat 16. Therefore, when the pressure of the fluid in the space beneath the piston 17 exceeds the force exerted by the spring 19 on the piston 17 the piston 17 will be moved upwardly against the spring, and the valve member 14 will be urged upwardly, as viewed in FIG. 1, to close the valve seat 16. The valve member 14 is urged upwardly because the sum of the upward forces acting on the valve member is greater than the sum of the downward forces acting on the valve member 14. It should be noted that the force exerted on the piston 17 by the pressure of the fluid in the space beneath piston 17 will depend on the amount of compression of the spring 19 and may be of any value up to the value of the inlet fluid pressure $P_1$. It therefore follows that the maximum force that can be exerted by the spring 19 on the piston 17 must be less than the force exerted on the piston 17 by the inlet fluid pressure $P_1$ to enable the fluid pressure to overcome the force of the spring 19 and move the piston 17 upwardly. Providing the fluid pressure in the space beneath the piston 17 and hence the outlet fluid pressure remains constant, the valve seat 16 will be maintained closed by the valve member 14. However if the outlet fluid pressure drops to a value less than the force exerted on the piston 17 by the spring 19 by virtue of tapping-off some of the fluid from the outlet duct 24, then the spring 19 will urge the piston 17 downwards which in turn will move the valve member 14 downwards to re-open the valve seat 16. If now fluid is continually tapped-off from the outlet duct 24 so that the force exerted on the piston 17 by the fluid pressure in the space beneath the piston 17 does not exceed the force exerted on the piston 17 by the spring 19, the valve seat 16 will remain open. The valve seat 16 will remain open until the force exerted on the piston 17 by the fluid pressure in the space beneath the piston 17 exceeds the force exerted by the spring 19, whereupon the valve seat 16 will be closed, as hereinbefore described. In order for the pressure of the fluid in the space beneath the piston 17 to increase, the tapping from the outlet duct 24 must be closed. The duct 29 in the valve member 14 is provided to permit the outlet fluid pressure $P_2$ to act on the lower end face of the valve member 14 within the socket 15 to reduce the out-of-balance forces acting on the valve member 14 due to the inlet fluid pressure $P_1$. If the valve member 14 is opened further by continued turning of the operating spindle 11, the spring 19 is compressed more and thus the load on the plunger 12 becomes greater, thereby requiring considerable effort by the operator in turning the spindle 11.

When it is desired to shut off the regulator and hence close the valve seat 16, the operating spindle 11 is turned to move the plunger 12 upwardly into its uppermost position, and so allow the spring 19 to return to its initial uncompressed condition. This will permit the valve member 14 to be moved upwardly by the spring 27 to close the valve seat 16.

Figure 2:
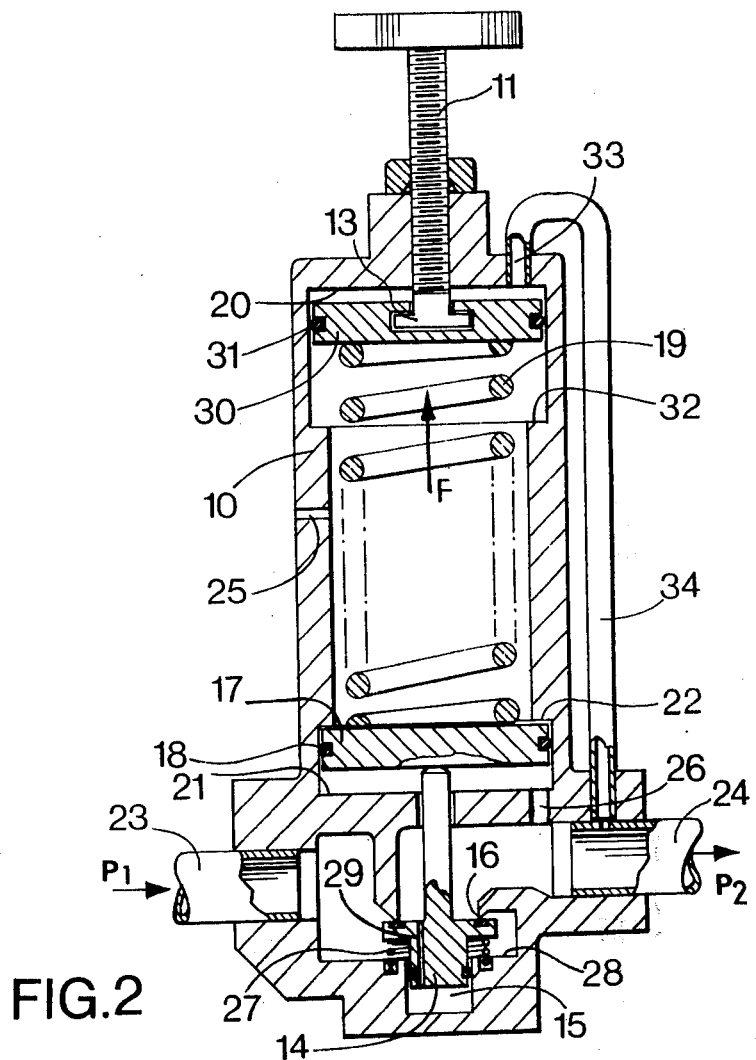
FIG. 2 is a view similar to FIG. 1 showing the regulator modified in accordance with the invention.

As already stated considerable effort is required by the operator in turning the spindle 11, and it is intended that the effort should be reduced by providing in accordance with the invention a modified regulator as shown in FIG. 2. The modified regulator shown in FIG. 2 comprises similar parts to those shown in the regulator of FIG. 1 and these have been given the same reference numerals. However in FIG. 2 the regulator has been modified by replacing the plunger 12 with a piston 30 which is slidable in the housing 10. The piston 30 carries around its periphery a sealing ring 31 which sealingly engages the housing 10. The axial movement of the piston 30 relative to the housing 10 is limited in the downward direction by a shoulder 32 provided in the housing 10. In addition there is a tapping between the outlet duct 24 and a port 33 at the upper end of the housing 10 through a pipe 34, whereby the pressure acting on the upper end face (as shown) of the piston 30 is the outlet pressure $P_2$ of the regulator.

Operation of the regulator shown in FIG. 2 is as follows:

Assuming that the valve member 14 is in its closed position in which the valve seat 16 is closed and that the pistons 17 and 30 are in their uppermost positions, there is negligible compression of the spring 19 as hereinbefore described with reference to FIG. 1. Also the valve member 14 is maintained in the closed position in the same manner as already described with reference to FIG. 1. When the operating spindle 11 is turned to move the valve member 14 downwards, as viewed in the drawing, to open the valve seat 16, the piston 30 also moves downwardly to compress the spring 19 which acts on the piston 17 to move the valve member 14 to open the valve seat 16. As already described with reference to FIG. 1, the force exerted by the spring 19 must be greater than the sum of the upward forces acting on the valve member 14. When the valve seat 16 is opened, fluid at a pressure being a function of the inlet fluid pressure $P_1$ is delivered through the outlet duct 24 and into the space beneath the piston 17 and into the space above the piston 30 through the pipe 34 and port 33. The regulator operates, when the valve seat 16 has been opened, in the same manner as that described with reference to FIG. 1. However, in addition the pressure of the fluid in the space above the piston 30 will increase from the outlet fluid pressure $P_2$ to a pressure which will exert a force on the piston 30 substantially equal to the force exerted on the piston 30 by the spring 19. This means that when the valve member 14 is opened further by continued turning of the operating spindle 11, the spring 19 is compressed more and thus the load on the piston 30 would become greater, thereby requiring considerable effort by the operator in turning the spindle 11, if it were not for the provision of the pressure tapping by which the outlet pressure $P_2$ is applied to the upper, as viewed in FIG. 2, end face of the piston 30 through the port 33. The downward force acting on the piston 30 is therefore a function of the outlet pressure $P_2$, that is the amount of opening of the valve member, and the effective area of the piston 30 is such that the downward force acting thereon is substantially equal and opposite to the upward reaction of the spring 19 on the piston 30. Thus the torque required to be applied to the operating spindle 11 to move the valve member 14 to open the valve seat 16 is substantially independent of the reaction of the valve member on the piston 30. It will be appreciated that the reaction of the valve member 14 acting on the piston 30 through the piston 17 and the spring 19 is the sum of the upward forces acting on the valve member 14.

The regulator is shut-off in the same way as hereinbefore described with reference to FIG. 1.

What I claim as my invention and desire to secure by Letters Patent of the United States is:

1. An adjustable fluid pressure regulator including a housing having fluid inlet and outlet ports, a valve seat positioned in the housing between said inlet and outlet ports, a valve member engageable with said valve seat and movable toward and away from valve seat to respectively close and open said valve seat, first resilient biasing means arranged between said valve member and said housing and acting on said valve member to urge it towards said valve seat, a first chamber defined in said housing, a first piston sealingly located in said first chamber, said valve member directly engaging said first piston under the action of said first resilient biasing means, an adjustable operating member in screw-threaded engagement with said housing, a second chamber defined in said housing and spaced from said first chamber, a second piston rotatably attached to said operating member and sealingly located in said second chamber, second resilient biasing means arranged between said first and said second pistons and acting on said first piston to urge said valve member away from said valve seat, fluid conduit means interconnecting said outlet port and said first chamber to apply the outlet fluid pressure to said first piston to oppose the action of said second resilient biasing means, and a conduit connecting said outlet port to said second chamber, whereby fluid pressure at said outlet port will act on said second piston to substantially balance the force on said operating member due to the action of said second resilient biasing means when the valve member has been moved away from said valve seat, the fluid pressure at said outlet port being predetermined by the position to which said operating member has been adjusted.

* * * * *